United States Patent [19]

Sappok et al.

[11] 4,298,526

[45] Nov. 3, 1981

[54] PREPARATION OF EASILY DISPERSIBLE AND DEEPLY COLORED PIGMENTARY FORMS

[75] Inventors: Reinhard Sappok, Heidelberg; Fritz Guellich, Dannstadt-Schauernheim; Karl Roth, Limburgerhof; Alois Wiesenberger, Lambsheim, all of Fed. Rep. of Germany

[73] Assignee: BASF Aktiengesellschaft, Ludwigshafen, Fed. Rep. of Germany

[21] Appl. No.: 94,984

[22] Filed: Nov. 16, 1979

[30] Foreign Application Priority Data

Nov. 30, 1978 [DE] Fed. Rep. of Germany ....... 2851752

[51] Int. Cl.³ .............................................. C09B 47/04
[52] U.S. Cl. .............................. 260/314.5; 106/288 Q; 106/308 Q; 106/309
[58] Field of Search ................. 260/314.5; 106/288 Q, 106/308 Q, 309

[56] References Cited

U.S. PATENT DOCUMENTS

| | | | |
|---|---|---|---|
| 2,716,649 | 8/1955 | Brouillard | 260/314.5 |
| 2,930,796 | 3/1960 | Katz et al. | 260/314.5 |
| 3,872,103 | 3/1975 | Fabian | 260/333 |
| 3,976,649 | 8/1976 | Fabian et al. | 260/281 P |
| 4,039,346 | 8/1977 | Kranz | 106/288 Q |
| 4,104,276 | 8/1978 | Kranz et al. | 260/314.5 |
| 4,115,386 | 9/1978 | Gall et al. | 260/281 P |
| 4,141,904 | 2/1979 | Cabut et al. | 260/314.5 |
| 4,158,572 | 6/1979 | Blackburn et al. | 106/288 Q |

FOREIGN PATENT DOCUMENTS

| | | | |
|---|---|---|---|
| 1239270 | 4/1967 | Fed. Rep. of Germany | 260/314.5 |
| 2103030 | 7/1971 | Fed. Rep. of Germany | 260/314.5 |
| 2252461 | 5/1974 | Fed. Rep. of Germany | 260/281 P |
| 2316536 | 10/1974 | Fed. Rep. of Germany | 260/281 P |
| 2357077 | 5/1975 | Fed. Rep. of Germany | 260/288 |
| 2512610 | 10/1975 | Fed. Rep. of Germany | 260/314.5 |
| 2635157 | 2/1976 | Fed. Rep. of Germany | 260/281 P |
| 2506832 | 8/1976 | Fed. Rep. of Germany | 260/314.5 |
| 2546266 | 4/1977 | Fed. Rep. of Germany | 260/281 P |
| 2545701 | 4/1977 | Fed. Rep. of Germany | 260/281 P |
| 2554252 | 6/1977 | Fed. Rep. of Germany | 260/314.5 |
| 2745893 | 4/1978 | Fed. Rep. of Germany | 260/314.5 |

OTHER PUBLICATIONS

Moser et al., Phthalocyanine Compounds, pp. 179 to 180, Reinhold Pub. Corp., NY (1963).

*Primary Examiner*—John D. Randolph
*Attorney, Agent, or Firm*—Oblon, Fisher, Spivak, McClelland & Maier

[57] ABSTRACT

A process for the preparation of pigmentary forms of phthalocyanine and of insoluble polycyclic compounds, wherein the crude pigment is milled in the presence of one or more acids which have a pK of <4.9 and are non-oxidizing under the milling conditions, until the primary particle size is $\leq 0.1$ μm, the milled material is then finished in the conventional manner in a solvent in the presence or absence of water, and the pigment is isolated.

The pigments give very deep colorations and are very easily dispersible in the media in which they are used.

9 Claims, No Drawings

PREPARATION OF EASILY DISPERSIBLE AND DEEPLY COLORED PIGMENTARY FORMS

The present invention relates to a process for the preparation of easily dispersible and deeply colored pigmentary forms of phthalocyanine and of polycyclic insoluble compounds.

Colorants used for pigmentary purposes, such as copper phthalocyanines, quinacridones, flavanthrones and perylenetetracarboxylic acid bis-imides are as a rule obtained in a coarsely crystalline form from their process of synthesis. In this form, they are of little or no value for tinctorial purposes, for which reason the products of the synthesis are also referred to as crude pigments. To prepare tinctorially useful pigments which, for example, have a high tinctorial strength, the crude pigments are therefore comminuted in suitable mills, for example ball mills and vibratory mills.

The powders thus produced, ie. the milled material, consist of agglomerates of from about 0.5 to 200 $\mu$m in size, essentially composed of primary particles of from 0.01 to 0.1 $\mu$m in length. The size of the primary particles can be determined, for example, for electron micrographs. The milled material thus obtained cannot be employed directly as pigments. In a second step, they are subjected to recrystallization in one or more organic solvents, in the presence or absence of water. In this process, crystallization, and from partial to substantially complete de-agglomeration of the agglomerates occurs. Processes of this type are described, for example, in German Laid-Open Applications DE-OS 2,252,461, 2,316,536, 2,357,077, 2,506,832, 2,545,701, 2,546,266, 2,554,252 and 2,635,157.

The conversion of the milled material to the pigmentary form can also be carried out in the presence of modifiers, surfactants or mixtures of these. Examples of such processes are described in German Laid-Open Applications DE-OS 2,745,893 and DE-OS 2,512,610, in British Pat. No. 1,263,684 and in German Pat. No. 1,239,270. In the latter three processes, a reduction in crystallization during the solvent treatment achieves a further increase in the tinctorial strength of the pigmentary form.

The recrystallization processes described are in general referred to as finishing.

The pigmentary forms obtained from the finishing treatment are then isolated and dried. For use, the pigments thus obtained must as a rule be thoroughly dispersed in the media in which they are employed, for example in printing ink binders, in solutions of such binders or in surface coatings, if they are to develop optimum tinctorial properties, the dispersion process being intended to achieve de-agglomeration of the particles of the pigment powder.

The present invention seeks to provide a process by means of which deeply colored pigmentary forms are obtained which are easily dispersible in the media in which they are employed.

We have found that a pigmentary form of a phthalocyanine or of a polycyclic insoluble compound, having improved properties compared to the prior art products, is obtained by milling the crude pigment under shearing stress and impact stress and then converting the milled material into a pigmentary form by recrystallization in an organic solvent and isolation of the pigment, if the crude pigment is comminuted in the presence of from 0.5 to 15 percent by weight, based on crude pigment, of one or more acids which have a pK of <4.9 and are non-oxidizing under the milling conditions, and in the absence of milling assistants.

Under the conventional finishing conditions, the process according to the invention gives easily dispersible and very deeply colored pigmentary forms.

The milled material according to the invention possesses substantially better wettability than the prior are milled material. Since the processes required for finishing the pigment take place very rapidly with the milled material according to the invention, the pigmentary form is obtained in very uniform crystals both as regards size and as regards shape.

Thus, for example, in the case of copper phthalocyanine the conversion of the $\alpha$-copper phthalocyanine component of the milled material to the $\beta$-modification takes place substantially more rapidly with the milled material used according to the invention than with the prior art milled material.

The milled material in the process according to the invention is obtained by comminuting the coarsely crystalline or agglomerated crude pigment, e.g. as obtained from the process of synthesis, in the presence of one or more acids of the stated type. The comminution can take place in conventional milling equipment suitable for dry comminution, especially in ball mills, vibratory mills or edge mills. Balls, especially those made from steel or a ceramic, are a suitable grinding medium.

The milling process may be carried out at from 0° to 140° C., as a rule at from room temperature (20° C.) to 90° C.

The milling time depends on the crude pigment and is suitably from 10 to 50 hours, in most cases from 20 to 30 hours. The milled material obtained usually consists of agglomerates of size from 0.5 to 150 $\mu$m, which are in general composed of primary particles of size 0.1 $\mu$m or less, preferably of primary particles of size from 0.01 to 0.05 $\mu$m. The sizes of the primary particles were determined by electron micrographs.

The non-oxidizing acids used in the milling operation have a pK of <4.9, preferably of <2.5. Specific examples are: 85–100% strength by weight sulfuric acid, 85–100% strength by weight phosphoric acid, $C_1$–$C_{20}$-alkane-sulfonic acids, alk-1-ene-1-sulfonic acids and 2-hydroxyalkane-1-sulfonic acids of 8 to 20 carbon atoms in the alkene or alkane radical respectively, sulfuric acid half-esters of $C_1$–$C_{20}$-alkanols, benzenesulfonic acid and naphthalenesulfonic acids, in which the benzene and naphthalene radical may be substituted by 1 or 2 $C_1$–$C_{20}$-alkyl and/or one hydroxyl, alkanoic acids of 1 to 5 carbon atoms, monochloroacetic acid, dichloroacetic acid and trichloroacetic acid, trifluoroacetic acid, maleic acid, dihydroxymaleic acid, tartaric acid, dihydroxytartaric acid and mixtures of these acids.

Specific examples of acids, in addition to those mentioned, are:

(a) as $C_1$–$C_{20}$-alkanesulfonic acids: methane-, ethane-, propane-, butane-, hexane-, octane-, decane-, dodecane-, tetradecane-, hexadecane- and octadecanesulfonic acid;

(b) as alk-1-ene-1-sulfonic acids and 2-hydroxyalkane-1-sulfonic acids; tetradec-1-ene-1-, octadec-1-ene-1-, 2-hydroxy-tetradecane-1- and 2-hydroxy-octadecane-1-sulfonic acid;

(c) as sulfuric acid half-esters of $C_1$–$C_{20}$-alkanols: the sulfuric acid half-esters of methanol, ethanol, propanol, butanol, hexanol, octanol, decanol, dodecanol, tetradecanol, hexadecanol and octadecanol;

(d) as benzenesulfonic and naphthalenesulfonic acids which may be substituted by alkyl and/or hydroxyl: benzenesulfonic acid, phenolsulfonic acid, o- and p-toluenesulfonic acid, xylenesulfonic acid, o- and p-ethylbenzenesulfonic acid, p-tert.-butylbenzenesulfonic acid, o-hydroxytert.-butylbenzenesulfonic acid, p-hexylbenzenesulfonic acid, p-octylbenzenesulfonic acid, p-nonylbenzenesulfonic acid, p-dodecylbenzenesulfonic acid, p-hexadecylbenzenesulfonic acid, p-octadecylbenzenesulfonic acid, o-hydroxy-m,m-bis-dodecylbenzenesulfonic acid, o-hydroxy-nonylbenzenesulfonic acid, o-hydroxydodecylbenzenesulfonic acid, o-hydroxy-hexadecylbenzenesulfonic acid, o-hydroxy-octadecylbenzenesulfonic acid, $\alpha$- and $\beta$-naphthalenesulfonic acid, butylnaphthalenesulfonic acid, dodecylnaphthalenesulfonic acid, didodecylnaphthalenesulfonic acid, octylnaphthalenesulfonic acid, dioctylnaphthalenesulfonic acid, dodecylnaphthol-1-sulfonic acid, didodecylnaphthol-1-sulfonic acid, octylnaphthol-1-sulfonic acid and dioctylnaphthol-1-sulfonic acid.

The amount of such non-oxidizing acids is from 0.5 to 15, preferably from 1 to 10, percent by weight based on crude pigment. A particularly advantageous pigment is obtained on finishing by using a milled material which is obtained by milling in the presence of from 2 to 7 percent by weight, based on crude pigment, of such a non-oxidizing acid.

For economic reasons, preferred non-oxidizing acids of this type are 85–100% strength by weight sulfuric acid, 85–100% strength phosphoric acid, formic acid, glacial acetic acid, trichloroacetic acid, methanesulfonic acid, benzenesulfonic acid, the toluenesulfonic acids, the naphthalenesulfonic acids, propionic acid or mixtures of these.

Suitable crude pigments include phthalocyanines, metal phthalocyanines which contain up to 2 chlorine and/or bromine atoms in the molecule, polyhalophthalocyanines and polycyclic compounds which are insoluble in water and in organic solvents. The latter compounds may be derived, for example, from anthraquinone, benzanthrone, anthrapyrimidine, azaporphine, bromoindigo, thioindigo, quinacridone, flavanthrone, pyranthrone, indanthrone, violanthrone, isoviolanthrone, dioxazine, naphthalene-1,4,5,8-tetracarboxylic acid diimide or perylene-3,4,9,10-tetracarboxylic acid and its diimide.

Specific examples, in addition to those already mentioned, of crude pigments suitable for the process according to the invention are: copper phthalocyanines which contain up to 2 chlorine or bromine atoms in the molecule, metal-free phthalocyanine, polychloro-copper phthalocyanines, polychloro-bromo-copper phthalocyanines which contain up to 14 atoms of bromine in the molecule, pyranthrone, dichloropyranthrone, dibromopyranthrone, dichloromonobromopyranthrone, dichlorodibromopyranthrone and tetrabromopyranthrone, anthrapyrimidine-2-carboxylic acid amides, for example with 1-aminoanthraquinone, flavanthrone, quinacridone, its dimethyl and dichloro derivatives, indanthrone and its monochloro, dichloro, trichloro and tetrachloro derivatives, dioxazine pigments, dibromoindigo, tetrabromoindigo, thioindigo, dibromothioindigo, naphthalene-1,4,5,8-dicarboxylic acid diimides, perylene-3,4,9,10-tetracarboxylic acid bis-anhydride, perylene-3,4,9,10-tetracarboxylic acid diimide and its bis-N,N'-$C_1$–$C_3$-alkyl derivatives and bis-N,N'-phenyl derivatives, in which latter derivatives the phenyl radicals may be substituted by groups which do not confer solubility in water.

The milled material is subsequently converted to the pigmentary form. Procedures for this conversion, i.e. for finishing, are known per se and conventional procedures may be used. Usually, finishing takes place, depending on the chemical character of the compounds, in one or more organic solvents or in mixtures of one or more solvents and in the presence or absence of water. The acid contained in the milled material may be neutralized by bases before, during or after finishing. If neutralization is not carried out, it is advantageous to wash the pigment neutral after it has been isolated from the finishing mixture.

The pigmentary form may be separated off and isolated from the finishing mixture by conventional methods, for example by filtering, decanting or centrifuging.

Examples of suitable organic solvents for the finishing treatment are aliphatic and aromatic hydrocarbons, eg. petroleum ether, hexane, heptane, octane, decane, benzene, toluene and the xylenes; $C_1$–$C_8$-alkanols, eg. methanol, ethanol, n- and i-propanol, the butanols, the pentanols, the hexanols and the octanols; $C_2$–$C_4$-diols and their mono-$C_1$–$C_5$-alkyl ethers, eg. ethylene glycol, 1,2- and 1,3-propylene glycol, the butanediols, monomethyl, monoethyl, monopropyl and monobutyl ethers of ethylene glycol and of 1,2-propylene glycol, diethylene glycol, triethylene glycol and monomethyl, monoethyl, monopropyl and monobutyl ethers of diethylene glycol, triethylene glycol and di-1,2-propylene glycol; cyclohexanol; aliphatic $C_3$–$C_8$-alkanones, eg. acetone, methyl ethyl ketone, diethyl ketone, methyl isopropyl ketone, diisopropyl ketone and methyl isobutyl ketone; aliphatic $C_4$–$C_8$-ethers and cyclic ethers, eg. diethyl ether, diisopropyl ether, tetrahydrofuran and dioxane; $C_3$–$C_{16}$-alkylamines, eg. n-and i-propylamine, n-, iso- and sec.-butylamine, hexylamine, octylamine and dodecylamine; aniline derivatives, eg. aniline, N,N-dimethylaniline, the toluidines and the xylidines; carboxylic acid amides of $C_1$–$C_3$-carboxylic acids and their N-mono- or N,N-bis-$C_1$–$C_4$-alkyl derivatives, eg. formamide, N-methylformamide, N,N-dimethylformamide, N,N-dimethylacetamide, N,N-dimethylpropionamide and N,N-dipropylformamide, pyrrolidone, N-methylpyrrolidone and mixtures of the above. The organic solvents may be used by themselves or together with water and in the latter case the mixture may be homogeneous or heterogeneous.

The Examples which follow illustrate the process according to the invention. Parts and percentages in the text which follows are by weight.

EXAMPLE 1

(a) 4.75 kg of chlorine-free crude copper phthalocyanine ($\beta$-modification) and 0.25 kg of 96% strength sulfuric acid are introduced into a ball mill (capacity 50 liters; filled with 50 kg of iron balls of 2–3 cm diameter), and are milled for 30 hours at 30° C.

The milled material, which contains 80% of the $\alpha$-midification of copper phthalocyanine, consists of agglomerates of from 0.5 to 150 $\mu$m in size, composed of primary particles of from 0.01 to 0.05 $\mu$m in size.

(b) Finishing 500 g of the milled product (a) are introduced into 3,500 g of a mixture which comprises 35% of n-propanol and 65% of water and the suspension is raised to the boil (88° C.) whilst stirring and then kept at this temperature for 4 hours. Thereafter the propanol is distilled off, the pigment is filtered off and the material is washed neutral on the filter, and dried at 80° C. The dried material is milled to a powder.

(c) Comparative pigment.

The procedure described in (a) is followed, except that milling is carried out in the absence of sulfuric acid, and the milled material is finished, and isolated, as described in (b).

The pigment obtained in accordance with (b) is substantially more easily dispersible in a surface coating than is the comparative pigment (c).

(d) Tinctorial test of the pigments in a letterpress printing ink.

The pigments obtained from (b) and (c) are used to prepare the following colored compositions:

(α) Full-shade paste 4.5 g of pigment are worked into a paste with 10.5 g of a varnish-like binder (grinding base S 100 from Lawter Chemicals), using a spatula, and the paste is ground on a triple roll mill in 3 passes under 10 bar pressure.

(β) White reduction 0.25 g of the full-shade paste (α) is mixed with 10.0 g of white paste (containing 30% of titanium dioxide) on a millstone mill.

The resulting ink is knife-coated onto cardboard and dried.

The resulting colorations (color depth: about 1/9 of the standard color depth) were evaluated by the FIAF method ("Farbe+Lack", 75 (1969), 854–862).

The results are shown in the Table which follows.

| 1/9 standard color depth | CE | H | S |
|---|---|---|---|
| comparative pigment (c) | 125.5 | 17.95 | 4.47 |
| pigment from (b) | 100.0 | 17.87 | 4.54 |

CE = color equivalent.
(c) 100 parts of pigment
(b) correspond, in tinctorial strength, to the stated amount of the comparative material.
H = hue
S = color saturation The color characteristics are stated in CIE numbers according to DIN 6164 (standard light C). A difference of 0.04 units in either H or S is regarded as clearly detectable by the color tester. For H, a larger numerical value in the present case indicates that the hue is greener, and a smaller numerical value that the hue is redder, than the comparative material. For S, a larger numerical value indicates greater purity of the hue.

EXAMPLE 2

210 g of the milled product from Example 1(a) are introduced into 800 g of a mixture comprising 7.5% of ethylene glycol monobutyl ether and 92.5% of water and the suspension is heated to 95° C. whilst being stirred and is then kept at this temperature for 2 hours. The suspension is then filtered and the product is washed free from butylglycol and sulfuric acid. The press cake is dried at 100° C. and the dry material is milled to a fine powder.

A tinctorial test as described in 1(d) gives a good result, similar to that of the pigment obtained according to Example 1(b), in relation to the comparative pigment according to 1(c).

EXAMPLES 3 to 6

The procedure described in Example 1 is followed, except that the following sulfonic acids are used in the milling operation in place of sulfuric acid:

| Example | Crude copper phthalocyanine [kg] | Sulfonic acid | Amount [kg] |
|---|---|---|---|
| 3 | 4.75 | methanesulfonic acid | 0.25 |
| 4 | 4.6 | n-hexane-1-sulfonic acid | 0.4 |
| 5 | 4.6 | tert.-butylnaphthalene-sulfonic acid | 0.4 |
| 6 | 4.5 | dodecylbenzenesulfonic acid | 0.5 |

The milled material is finished as described in Example 1(b). The pigments obtained have the same good tinctorial properties, especially the same good dispersibility, as the pigment obtained in Example 1(b).

EXAMPLE 7

(a) 285 g of crude copper phthalocyanine, containing an average of 0.5 chlorine atom per molecule, are milled in a ball mill (capacity 5 liters; filled with 3 kg of steel balls in diameter 2–3 cm) with 15 g of 96% strength sulfuric acid for 25 hours. The milled material is a densified powder, possessing a metallic luster, and consists of agglomerates of from 1 to 200 μm in size, composed of primary particles of from 0.01 to 0.1 μm in size.

(b) Finishing 150 g of the milled product (a) are introduced, with stirring, into a mixture of 450 g of xylene and 450 g of water in a glass flask. The mixture is raised to the boil and refluxed for 4 hours. The xylene is then removed by distillation, the water distilled off being replaced. The aqueous dispersion is filtered and the press cake is dried in an oven at 80° C.

(c) Comparative pigment

The procedure followed is as described in (a), except that milling is carried out without addition of sulfuric acid, and the milled material is then finished, and worked up, as described in (b).

The pigment obtained according to (b) gives substantially deeper and purer colorations than the comparative pigment (c).

(d) Tinctorial comparison in a baking finish.

Baking finishes are prepared with the pigments obtained from (b) and (c), and the colorations obtained with the finishes, after baking, are evaluated colorimetrically, and compared (see Example 1d):

(α) Full-shade finish 5 parts of the pigment from (b) or from (c) and 95 parts of a colorless finish based on an alkyd-melamine resin are mixed with 300 cm³ of glass beads (2 mm diameter) in a plastic beaker and dispersed on a shaker (®RED DEVIL). After having shaken the mixture for 6 minutes, a sample (sample 1) is taken. The remainder is shaken for a further 54 minutes (making a total of 60 minutes), and the finish is then separated from the glass beads (sample 2).

(β) White reduction 2 g portions of samples (1) and (2) obtained in (α) are mixed with 10 g of a white finish (30% of titanium dioxide), and the mixture is applied to cardboard by means of a knife coater.

The difference in tinctorial strength between the colorations obtained with sample (1) and with sample (2) is a measure of the dispersibility of the pigment, sample 2 being taken as the final depth of color achievable.

The dispersibility DH is calculated from the equation $$DH = \frac{F_2}{F_1} - 1 \cdot 100$$

where $F_1$=depth of color of the white reduction using the full-shade finish of sample 1, $F_2$=depth of color of the white reduction using the full-shade finish of sample 2.

The dispersibility is the better, the smaller is the value of DH. The dispersibility values found for the pigment obtained according to (b) and for the comparative pigment (c) are shown in the Table below.

The Table furthermore shows the color equivalent, the hue and the color saturation of the white reductions. The white reductions were prepared with the pigments prepared according to (b) and (c), which were dispersed for 1 hour on a shaker as described in ($\alpha$) and then mixed with the white finish according to ($\beta$).

|  | CE | H | S | DH |
|---|---|---|---|---|
| Comparative pigment (c) | 116.3 | 17.67 | 4.16 | 45 |
| Pigment from (b) | 100.0 | 17.72 | 4.22 | 17 |

Notes on the meanings of CE, H and S are given in Example 1(d).

EXAMPLES 8 to 10

The procedure followed was as described in Example 7(a), except that instead of sulfuric acid the sulfonic acid shown below were used.

| Example | Crude pigment [g] | Sulfonic acid | Amount [g] |
|---|---|---|---|
| 8 | 285 | methanesulfonic acid | 18.2 |
| 9 | 280 | tert.-butylphenolsulfonic acid | 24 |
| 10 | 280 | dodecylbenzenesulfonic acid | 24 |

The milled material was finished as described in Example 7(b) and the pigments were isolated. The pigments obtained had virtually the same tinctorial properties as the pigment obtained according to Example 7(b).

White reductions were prepared, similarly to Example 7(d), with the pigments obtained according to Examples 8 to 10, and these were evaluated colorimetrically.

| Pigment from Example | CE | H | S | DH |
|---|---|---|---|---|
| 8 | 98.0 | 17.70 | 4.23 | 15 |
| 9 | 102.0 | 17.72 | 4.20 | 10 |
| 10 | 101.0 | 17.69 | 4.21 | 20 |
| Comparative example 7(c) | 116.3 | 17.67 | 4.16 | 45 |

EXAMPLE 11

(a) 285 g of perylene-3,4,9,10-tetracarboxylic acid N,N'-dimethylimide (crude pigment) and 15 g of 96% strength sulfuric acid are milled as described in Example 7(a), for 30 hours.

(b) Finishing 150 g of the milled product from (a) are introduced into a mixture of 180 g of n-butylamine and 720 g of water and the batch is stirred for 4 hours at the boil. The butylamine is then distilled off, whilst keeping the volume of the suspension constant by adding water. The pigment is filtered off, washed with water and dried.

(c) Comparative pigment

Crude perylene-3,4,9,10-tetracarboxylic acid N,N'-dimethylimide is milled as described in (a), but in the absence of sulfuric acid. The milled material is then finished, as described in (b), to give the pigment, which is isolated.

(d) White reductions are prepared by the method of Example 7(d) with the pigments obtained according to (b) and (c), and the colorations obtained with these white reductions are evaluated colorimetrically.

|  | CE | H | S | Hue of the full shade |
|---|---|---|---|---|
| Comparative pigment (c) | 169 | 9.48 | 2.02 | — |
| Pigment (b) | 100 | 9.47 | 2.32 | darker and more transparent than (c) |

Pigment (b), whilst having virtually the same hue, is substantially more deeply colored and has a substantially purer hue.

EXAMPLE 12

(a) 285 g of crude 6,14-dichloropyranthrone are milled with 5 g of 96% strength sulfuric acid for 30 hours as described in Example 7(a).

(b) Finishing 300 g of milled product (a) are introduced into 900 g of water and 30 g of o-nitrophenol and the mixture is refluxed for 4 hours whilst stirring. The o-nitrophenol is then dissolved by adding 19 g of 50% strength sodium hydroxide solution and the colorant suspension is filtered. The filter residue is washed neutral and dried.

(c) Comparative pigment

The crude 6,14-dichloropyranthrone is milled as described in (a), but in the absence of sulfuric acid, and the milled material was finished as described in (b).

(d) Tinctorial comparison: full-shade finishes and white reductions are prepared, similarly to Example 7(d), with the pigments obtained according to (b) and (c). The result of comparing the colorations obtained is summarized in the Table which follows:

|  | Tinctorial properties[+] | | | |
|---|---|---|---|---|
|  | CE | H | S | Full shade |
| Pigment (c) | 150 | 4.47 | 3.93 | — |
| Pigment according to (b) | 100 | 4.45 | 4.17 | darker and more opaque than (c) |

[+]The pigments are dispersed in the binder for 60 minutes on a shaker.

The pigment (b) obtained by the process according to the invention has a substantially deeper color, and a substantially purer hue, than the pigment obtained according to (c).

EXAMPLES 13 to 16

The procedure described in Example 12(a) was followed, but instead of sulfuric acid the following acids were added before milling:

| Example | Crude pigment [g] | Acid | Amount [g] |
|---|---|---|---|
| 13 | 280 | p-tert.-butylphenol-sulfonic acid | 14 |
| 14 | 285 | dodecylbenzenesulfonic acid | 20 |
| 15 | 275 | naphthalenesulfonic acid | 19.4 |
| 16 | 280 | n-octanesulfonic acid | 14 |

The milled materials were finished as described in Example 12(b). Pigments which have virtually the same properties as that produced according to Example 12(b) were obtained.

EXAMPLE 17

(a) 270 g of crude perylene-3,4,9,10-tetracarboxylic acid N,N'-bis-(p-ethoxyphenyl)-imide are milled for 30 hours with 30 g of 96% strength sulfuric acid, as described in Example 7(a).

(b) Finishing 200 g of the milled product (a) are suspended in 1,000 g of water and 40 g of ethylene glycol monobutyl ether. The sulfuric acid contained in the milled product is neutralized by adding sodium hydroxide solution. A solution of 20 g of a rosin in 4 g of 50% strength sodium hydroxide solution and 96 g of water is then added to the suspension and the mixture is stirred for half an hour at 60°–70° C. The resin is precipitated onto the pigment by adding sulfuric acid. The pigment dispersion is filtered and the product is washed and dried.

(c) Comparative pigment: milling is carried out as in (a), but in the absence of sulfuric acid, and the milled material is finished as described under (b).

(d) Tinctorial comparison: full-shade finishes and white reductions are prepared with the pigments from (b) and (c), by the method described in Example 7(d). The comparison of the colorations obtained is summarized in the Table below:

|  | Tinctorial properties(+) | | | |
|---|---|---|---|---|
|  | CE | H | S | Full shade |
| Pigment (c) | 148 | 9.00 | 2.97 | |
| Pigment according to (b) | 100 | 9.22 | 3.03 | darker and more transparent than (c) |

(+)The pigments are dispersed in the binder for 60 minutes on a shaker.

The hue of the white reduction obtained with (b) is purer than that of the coloration obtained with (c).

EXAMPLE 18

(a) 270 g of crude perylene-3,4,9,10-tetracarboxylic acid diimide and 30 g of 96% strength sulfuric acid are milled for 30 hours as described in Example 7(a).

(b) Finishing 150 g of the milled product from (a) are introduced into a mixture of 300 g of n-butylamine and 150 g of water and the batch is stirred for 15 hours at the boil. The butylamine is then distilled off, whilst keeping the volume of the suspension constant by adding water.

The pigment is filtered off, washed with water and dried.

(c) Comparative pigment

Crude perylene-3,4,9,10-tetracarboxylic acid diimide is milled as described in (a), buty in the absence of sulfuric acid. The milled product is then finished, as described in (b), to give the pigment, which is isolated.

(d) White reductions are prepared by the method of Example 7(d) with the pigments obtained according to (b) and (c), and the colorations obtained with these white reductions are evaluated colorimetrically.

|  | CE | H | S | Hue of the full shade |
|---|---|---|---|---|
| Comparative pigment (c) | 116 | 11.17 | 1.79 | |
| Pigment (b) | 100 | 11.10 | 1.90 | distinctly darker and more transparent than (c) |

The pigment obtained according to (b) gives a substantially more deeply colored white reduction, of purer hue, than the comparative pigment (c).

EXAMPLE 19

(a) 285 g of crude indanthrone are milled with 15 g of 96% strength sulfuric acid as described in Example 7(a).

(b) Finishing 150 g of the milled product (a) are introduced into 450 g of methyl ethyl ketone and the mixture is stirred for 3 hours at the boil. The methyl ethyl ketone is distilled off whilst running water into the mixture. The pigment is filtered off, washed with water and dried.

(c) Comparative pigment

Crude indanthrone is milled as described in (a), but in the absence of sulfuric acid. The milled material is then finished, as described in (b), to give the pigment, which is isolated.

(d) White reductions are prepared by the method of Example 7(d) with the pigments obtained according to (b) and (c), and the colorations obtained with these white reductions are evaluated colorimetrically.

|  | CE | H | S | Hue of the full shade |
|---|---|---|---|---|
| Comparative pigment (c) | 110 | 16.93 | 3.10 | |
| Pigment (b) | 100 | 17.00 | 3.16 | darker and more transparent than (c) |

The white reduction obtained according to (b) has a somewhat greener hue, which is somewhat purer and deeper than that of the white reduction of the comparative pigment (c).

EXAMPLE 20

(a) 285 g of crude flavanthrone are milled with 15 g of 96% strength sulfuric acid as described in Example 7(a). Milling time: 20 minutes.

(b) Finishing 150 g of the milled product (a) are introduced into a mixture of 150 g of methyl ethyl ketone and 300 g of water and the batch is stirred for 5 hours at the boil. The methyl ethyl ketone is then distilled off whilst adding water. The pigment is filtered off, washed with water and dried.

(c) Comparative pigment

Crude flavanthrone is milled as described in (a), but in the absence of sulfuric acid. The milled material is then finished, as described in (b), to give the pigment, which is isolated.

(d) White reductions are prepared by the method of Example 7(d) with the pigments obtained according to (b) and (c), and the colorations obtained with these white reductions are evaluated colorimetrically.

| 1/9 standard color depth | CE | H | S | Hue of the full shade |
|---|---|---|---|---|
| Comparative pigment (c) | 112 | 2.28 | 4.50 | |
| Pigment (b) | 100 | 2.22 | 4.56 | less dark and more transparent than (c) |

The white reduction obtained with (b) is substantially deeper in color, and has a purer hue, than the white reduction of comparative pigment(c).

EXAMPLE 21

(a) 285 g of crude quinacridone are milled as described in Example 7(a), but using 15 g of phenolsulfonic acid. Milling time: 25 hours.

(b) Finishing 150 g of the milled product (a) are introduced, with stirring, into a mixture of 40 g of ethylene glycol monobutyl ether and 360 g of water. The suspension is stirred for 4.5 hours at the boil. The pigment is then filtered off and washed free from phenolsulfonic acid and butylglycol by means of water. After having been dried at 80° C., the material is milled in a pin mill.

(c) Comparative pigment

Crude quinacridone is milled as described in (a), but in the absence of phenolsulfonic acid. The milled material is then finished as described in (b).

(d) The pigments according to (b) and (c) are tested as described in Example 7(d).

| 1/9 standard color depth | CE | H | S | Hue of full shade |
|---|---|---|---|---|
| Comparative pigment (c) | 116 | 11.10 | 3.70 | |
| Pigment (b) | 100 | 11.04 | 3.79 | darker and more transparent than (c) |

The pigment according to the invention is substantially deeper in color and purer in hue.

EXAMPLE 22

(a) A mixture of 285 g of crude copper phthalocyanine (chlorine-free; β-modification) and 15 g of 100% strength acetic acid is milled for 30 hours in a ball mill (capacity 5 liters; charged with 3 kg of steel balls of diameter 2-3 cm).

(b) Finishing 105 g of the milled product (a) are introduced into a mixture of 405 g of n-propanol and 495 g of water, while stirring. The suspension is heated to the boil and stirred at this temperature for 4 hours. The n-propanol is then removed by distillation, the liquid distilled off being replaced by water. The pigment suspension is filtered and the filter residue is dried at 80° C.

(c) Comparative pigment

The procedure described in (a) is followed, but milling is carried out in the absence of acetic acid, and the milled material is then finished as described in (b), and isolated.

(d) Tinctorial test

The test is carried out as described in Example 1(d). The result is summarized in the Table below.

| 1/9 standard color depth | CE | H | S |
|---|---|---|---|
| Comparative pigment (c) | 115 | 17.95 | 4.24 |
| Pigment from (b) | 100 | 17.90 | 4.30 |

The pigment according to the invention is deeper in color and purer in hue than the comparative pigment.

EXAMPLES 23 to 26

The procedure described in Example 22 is followed, but instead of acetic acid the following acids are used:

| Example | Crude copper phthalocyanine [g] | Acid | Amount [g] |
|---|---|---|---|
| 23 | 275 | maleic acid | 25 |
| 24 | 285 | trichloroacetic acid | 15 |
| 25 | 285 | concentrated phosphoric acid | 15 |
| 26 | 280 | propionic acid | 20 |

On finishing the milled materials as described in Example 22(b), the pigments obtained have equally good tinctorial properties, and in particular equally good dispersibility, as the pigment obtained according to Example 22(b).

We claim:

1. In a process for the preparation of an easily dispersible and deeply colored pigmentary form of a phthalocyanine selected from the group consisting of metal-free phthalocyanine, metalized phthalocyanines containing up to 2 chlorine or bromine atoms in the molecule, and polyhalophthalocyanines, by comminuting the crude pigment under shearing stress and impact stress in the absence of milling assistants, converting the milled material to a pigmentary form by recrystallization in organic solvent, and isolating the pigment, the improvement which comprises comminuting the crude pigment in the presence of from 0.5 to 15 percent by weight, based on crude pigment, of one or more acids which have a pK of <4.9 and are non-oxidizing under the milling conditions until the primary particle size is not greater than 0.1 μm.

2. A process as claimed in claim 1, wherein the crude pigment is comminuted in the presence of from 1 to 10 percent by weight, based on crude pigment, of one or more non-oxidizing acids.

3. A process as claimed in claim 1, wherein the crude pigment is comminuted in the presence of from 2 to 7 percent by weight, based on crude pigment, of one or more non-oxidizing acids.

4. A process as claimed in claim 1 or 3, wherein one or more acids which have a pK of <2.5 and are non-oxidizing under the milling conditions are used.

5. A process as claimed in claim 1 or 2, wherein the acids used are 85-100% strength by weight sulfuric acid, 85-100% strength by weight phosphoric acid, $C_1$–$C_{20}$-alkanesulfonic acids, benzenesulfonic acid, naphthalenesulfonic acids, mono-$C_1$–$C_{20}$-alkylbenzenesulfonic acids, di-$C_1$–$C_{20}$-alkylbenzenesulfonic acids, mono-$C_1$–$C_{20}$-alkylnaphthalenesulfonic acids, di-$C_1$–$C_{20}$-alkylnaphthalenesulfonic acids, mono-$C_1$–$C_{20}$-alkylphenolsulfonic acids, di-$C_1$–$C_{20}$-alkylphenolsulfonic acids, mono-$C_1$–$C_{20}$-alkylnaphtholsulfonic acids, di-$C_1$-$C_{20}$-alkylnaphtholsulfonic acids, alk-1-ene-1-sulfonic acids of 8 to 20 carbon atoms, 2-hydroxy-alkane-1-sulfonic acids of 8 to 20 carbon atoms, monochloroacetic acid, dichloroacetic acid, trichloroacetic acid, trifluoroacetic acid, maleic acid, dihydroxymaleic acid, tartaric acid, dihydroxytartaric acid, sulfuric acid halfesters of $C_1$-$C_{20}$-alkanols, alkanoic acids of 1 to 5 carbon atoms, or mixtures of two or more of these acids.

6. A process claimed in claim 1 or 3, wherein the acid used is 85-100% strength by weight sulfuric acid, 85-100% strength by weight phosphoric acid, formic acid, glacial acetic acid, propionic acid, trichloroacetic acid, methanesulfonic acid, benzenesulfonic acid, toluenesulfonic acids, naphthalenesulfonic acids, or a mixture of two or more of these acids.

7. A process as claimed in claim 1, wherein the crude pigment used is copper phthalocyanine which contains up to 2 chlorine or bromine atoms per molecule, metal-free phthalocyanine, polychloro-copper phthalocyanines, or polychloro-bromo-copper phthalocyanines which contain up to 14 bromine atoms in the molecule.

8. A process as claimed in claim 1, wherein the recrystallization is carried out in one or more organic solvents in the presence of water.

9. A process as claimed in claim 1 or 8, wherein the organic solvents used are selected from the grup consisting of aliphatic and aromatic hydrocarbons, $C_1$-$C_8$-alkanols, $C_2$-$C_4$-diols, mono-$C_1$-$C_5$-alkyl ethers of $C_2$-$C_4$-diols, diethylene glycol, triethylene glycol, $C_1$-$C_4$-alkyl ethers of diethylene glycol, of triethylene glycol and of dipropylene glycol, cyclohexanol, $C_3$-$C_8$-alkanones, aliphatic $C_4$-$C_8$-ethers, tetrahydrofuran, dioxane, $C_3$-$C_{16}$-alkylamines, aniline, N,N-dimethylaniline, toluidines, xylidines, $C_1$-$C_3$-alkanoic acid amides, N-$C_1$-$C_4$-alkyl-$C_1$-$C_3$-alkanoic acid amides, N,N-di-$C_1$-$C_4$-alkyl-$C_1$-$C_3$-alkanoic acid amides, N-methylpyrrolidone, pyrrolidone, and mixtures of two or more of these.

\* \* \* \* \*